Patented July 29, 1930

1,771,744

UNITED STATES PATENT OFFICE

ALBERT L. CLAPP, OF DANVERS, MASSACHUSETTS, ASSIGNOR TO THE FLINTKOTE COMPANY, OF BOSTON, MASSACHUSETTS, A CORPORATION OF MASSACHUSETTS

WATERPROOF PAPER PRODUCTS AND THE LIKE AND PROCESS OF MAKING THE SAME

No Drawing. Application filed June 9, 1926, Serial No. 114,868. Renewed March 24, 1927.

This invention primarily has relation to waterproof fibrous products, such as paper, paper board, and the like, and a process of making the same. More specifically, this invention is concerned with fibrous products uniformly permeated throughout with a high proportion of unsaponified bituminous material, such as asphalt, fused onto the fibers thereof, and a process of making the same.

In accordance with the process of this invention, the asphalt is initially dispersed in an aqueous solution of sodium silicate. The asphalt dispersion is then incorporated in desired amount into papermaking stock in the beater engine, and a suitable insoluble-silicate-forming precipitant, e. g., alum is then added to the stock. The precipitant flocculates the dispersion by precipitating aluminum silicate from solution. The aluminum silicate comes down in the form of a voluminous, flocculent precipitate, which entrains and carries down therewith substantially in entirety the dispersed asphalt particles and fixes them on the stock, so that a minimum loss of waterproofing material results in the water draining from the papermaking machinery. The sodium silicate solution thus serves a double use; initially constituting the external or continuous phase of the aqueous dispersion and stabilizing the asphalt dispersed therein, and subsequently undergoing precipitation in the beater engine in the form of an insoluble silicate and effecting the fixture of the asphalt particles on the stock. The aluminum silicate precipitated on the stock also serves as an excellent filling material for the paper product.

The sized stock is then formed into paper on a suitable papermaking machine provided with the usual dryers and calender rolls. Upon its passage through the dry end of the paper machine, the paper web is heated to a temperature above the melting point of the asphalt therein, resulting in the fusion and coalescence of the particles and the permeation of the entire web therewith. In other words, the asphalt becomes fused onto the individual fibers of the paper, so that the paper is rendered highly resistant to the action of moisture or water.

In carrying out the process, an aqueous sodium-silicate-asphalt dispersion is prepared as described in my application, Serial No. 39,049, filed June 23, 1925. As described in that application the dispersion is produced by heating and melting the asphalt and, while in molten condition, intimately mixing it in suitable proportion with a hot, aqueous solution of sodium silicate, until the asphalt has been resolved or dispersed into fine particles as the disperse or internal phase of the dispersion, stabilized by the aqueous sodium silicate solution which constitutes the continuous or external phase of the dispersion. The asphalt employed may be a natural or artificial asphalt, and is preferably one solid at usual atmospheric temperature. For instance, a residual asphalt of relatively low melting point (say, 100° F.), or an oxidized or blown asphalt having tough, rubbery characteristics and a melting point of about 240° F., or other asphalt having a melting point falling within the range between these temperatures, may be used. If desired, a small proportion of certain other thermoplastic waterproofing materials, such as rosin or wax of the nature of montan, carnauba or paraffin, or the like, may be melted and blended into the asphalt prior to its dispersion. Furthermore, a softening or tempering agent, such as mineral oil, may be blended into the asphalt to lower its melting point, especially when it possesses a high melting point.

A specific example of procedure in producing the dispersion may be substantially as follows: Asphalt having a melting point of about 200° F., for example (together with about 10% rosin, wax, or other thermoplastic waterproofing material, if desired), is melted and heated to a temperature above its melting point, to render it sufficiently fluid for dispersion, say, 320° F. to 360° F. A dispersing solution is prepared by diluting sodium silicate (60° Baumé) with approximately an equal weight of water, and the solution is then heated to a temperature of from about 180° F. to its boiling temperature. At these respective temperatures the viscosities or fluidities of the asphalt and the sodium silicate solution are about the same or not greatly different. A very effective dispersion or resolution of the asphalt into ultrafine or colloidal particles has been found to result when these materials are intimately mixed together at about the same viscosities. The materials are brought together and intimately mixed with one another in suitable proportion, about 1000 parts of asphalt (or 900 parts of asphalt and 100 parts of other thermoplastic material) and about 700 parts of the sodium silicate solution resulting in the production of a stable, non-adhesive dispersion of a creamy consistency, which may be diluted with water to any desired degree.

Such a dispersion may be effected in a continuous dispersing device of the type described in my application, Serial No. 55,063, filed September 8, 1925. The device, in brief, comprises an inclined cylindrical shell, provided with agitating blades or paddles, into the upper portion of which the materials are introduced. The materials are intimately mixed with one another for only a very short period of time (about one to two minutes being sufficient) and issue from the lower end of the shell in the form of a dispersion, the asphalt having been dispersed in the upper portion of the device into fine, discrete particles of colloidal size, protected or filmed by the dispersing solution. Preferably after the dispersion has been effected in the device, it is rapidly chilled below the freezing or congealing temperature of the asphalt particles, thus effecting the congelation of the particles in fine form and minimizing coalescence or agglomeration of the particles. The chilling of the dispersion may be effected by introducing cold water into the lower end of the dispersing shell, or by passing a cooling medium through a jacket formed about the lower end of the shell, passed in countercurrent flow to the flow of the dispersion. Even if saponifiable material, such as rosin or carnauba wax, has been blended into the asphalt, a substantial saponification of such material is not effected, if the dispersion is rapid and chilling of the product is prompt. Consequently, the small amount of soap which may be produced by saponification of the saponifiable wax with the sodium silicate is adventitious and is not relied upon as the dispersing agent.

Where the dispersion is produced by a batch process, the liquefied asphalt is gradually and progressively added to the heated solution of sodium silicate, which is continuously agitated until the desired concentration of dispersed asphalt has been attained therein. Production by the batch process is less desirable than by the continuous process from the fact that larger apparatus and a longer period of time are required for dispersion. Furthermore, when saponifiable materials are blended into the asphalt, a substantial saponification may take place, the insoluble soap later precipitated from the dispersion when it is added to the papermaking stock in the beater engine being inferior as a waterproofing agent, promoting foaming in the beater and in paper-forming operation, and being non-fusible at the usual temperatures maintained at the dry end of a paper machine.

The aqueous sodium-silicate-asphalt dispersion may be employed with advantage in waterproofing paper, being particularly applicable for producing heavy papers, such as wrapping paper, sheathing, roofing felt, panel board, or the like. A high percentage of waterproofing material may be incorporated in dispersion form into papermaking stock, without encountering difficulty due to excessive foaming in the beater or in paper formation. Where insoluble metallic soaps precipitated as waterproofing material on paper stock are employed, as in usual practice, however, only a limited and relatively small proportion of such material may be incorporated into the stock, due to excessive foaming, which interferes with beater operation and successful papermaking operation. Moreover, as previously stated, such metallic soaps do not fuse onto the fibers at the temperature usually maintained at the dry end of the paper machine, and are inferior in waterproofing capacity to unsaponified waterproofing material, such as asphalt.

The dispersion, diluted with water to the desired degree, is added to fibrous papermaking stock in the beater engine, together with sufficient water to ensure the circulation of such stock. The dispersion may be added in sufficient amount to produce a paper containing, for example, as high as from 10% to 40% asphalt, based on the dry weight of stock, the quantity of dispersion and the variety of asphalt contained therein varying with the characteristics of the final product which it is desired to produce. So, too, the papermaking stock may vary considerably in composition, and may be composed of mechanical or chemical wood pulp, mixed paper or rags, or long or short fibers of animal or vegetable origin.

The dispersion is uniformly disseminated throughout the fibrous stock by the operation of the beater roll, whereupon a suitable insoluble-silicate-forming precipitant, such as aluminum sulphate or alum, is added thereto. This fixes the dispersion on the stock by the precipitation of the dispersing agent as a flocculent insoluble silicate. About 10 parts of alum to 100 parts of asphalt in a dispersion prepared by the procedure followed in the example hereinbefore given ensures the precipitation of substantially all the silicate and a retention of substantially all the dispersed asphalt on the stock. The aluminum silicate comes down as a voluminous, flocculent precipitate, which entrains and carries down therewith and fixes substantially all the dispersed asphalt particles on the stock, an especially high retention of dispersed asphalt by the stock being attained and very little asphalt being lost in the water drained off from the paper machine. The precipitated aluminum silicate, itself, serves as an excellent loading material or filler; but, if desired, other fillers, e. g., cellite, clay, kieselguhr, diatomaceous earth, wood flour, or the like, may be added separately, or together with the dispersion, to the stock.

The sized stock is then formed into paper on a Fourdrinier or other papermaking machine, provided with the usual dryers and hot calenders. In passing over the dryers and through the calender rolls the asphalt particles, having a melting point of 100° F. to 240° F., depending on the particular variety of asphalt employed, coalesce within the paper and become fused onto the fibers thereof, effecting a uniform permeation of the entire sheet. The fibers thus become encased in the waterproofing material, and consequently the paper is highly resistant to the action of moisture and water.

Where a paper or paper board of large caliper is desired, the stock may be formed into a web on a wet or cylinder machine, so-called, and built up into a plurality of laminæ or convolutions to the desired caliper, on the make-up roll. The builtup web may then be stripped from the roll, dried, pressed and hot calendered, or otherwise heated to a temperature above the melting point of the particles of asphalt fixed therein, to cause their coalescence and fusion on the fibers. Furthermore, if desired, a heavy paper or board may be made on a multi-cylinder machine. In such case, all the plies or certain only of the plies of the paper may be made from stock sized with the asphalt dispersion. The paper is then heated to cause the fusion of the dispersed asphalt therein.

The sized stock may, if desired, be moulded into articles of the desired shape and the shaped articles may be subjected, either during or after the moulding operation, to a temperature above the fusing point of the dispersed asphalt particles.

The dispersion may also be employed as a binder, as well as a waterproofing material. For example, it may be incorporated into comminuted material, such as sawdust, which may then be moulded and compacted, dried, and then baked or otherwise heated to a temperature above the fusing point of the dispersed particles.

I do not claim herein broadly as my sole invention a sized fibrous paper stock in which particles of dispersed asphalt are fixed and retained on the fibers substantially wholly by a voluminous flocculent insoluble silicate such as aluminum silicate, or a water-resistant paper product containing asphalt fused on the fibers thereof, together with aluminum silicate, these products being disclosed and claimed in the joint application for patent of Lester L. Kirschbraun and myself, Serial No. 443,247, filed February 7, 1921, Patent No. 1,708,926, granted April 9, 1926.

While I have described certain specific examples of procedure, it should be obvious that these examples may be departed from. For example, the quantity of sodium silicate employed as the dispersing agent is subject to variation, depending upon the specific variety of asphalt which is to undergo dispersion, and the quantity necessary to effect a high retention of asphalt on the stock. Also the temperature to which the materials should be heated in producing the dispersion may be varied. The temperature of dispersion employed in any event, however, is above the melting point of the particular asphalt employed. Furthermore, a portion of the sodium silicate employed as a dispersing agent may be replaced by a soap size, such as sodium resinate, which also functions as a dispersing agent, although I preferably employ only sodium silicate, inasmuch as the use of soaps may cause difficulty in paper formation and in the beater engine, and such materials are inferior to asphalt as waterproofing agents. As previously stated, a proportion of the asphalt may be replaced by other thermoplastic waterproofing materials, and, if desired, tempering agents, such as mineral oils or the like, may be employed therewith. Furthermore, any suitable agent other than alum or aluminum sulphate, such as other metallic salts, may serve as the precipitant for producing an insoluble silicate, although alum in preferably employed because of its cheapness and effectiveness. It should be noted that the sodium silicate plays a double function in the present invention; it not only serves as the dispersing or stabilizing agent, but also is subsequently reacted upon to form an insoluble silicate, which fixes and retains the dispersed particles substantially in entirety on the stock.

Having described the nature of this invention and certain ways of making and using the same, but without describing all the ways in which it may be made or all its uses, what I claim is:

1. A process which comprises incorporating an aqueous sodium-silicate-asphalt dispersion into comminuted material, adding an agent capable of reacting with the sodium silicate to precipitate the asphalt in unaltered state and form an insoluble silicate, drying the material, and then heating the material above the melting point of the asphalt particles to cause the coalescence and fusion of the particles in such material.

2. A process which comprises incorporating an aqueous sodium-silicate-asphalt dispersion into fibrous stock, and then adding an agent capable of reacting with the sodium silicate to form an insoluble silicate.

3. A process which comprises incorporating an aqueous sodium-silicate-asphalt dispersion into fibrous stock, adding an insoluble-silicate-forming reagent to the stock, drying the stock, and then heating the stock above the melting point of the asphalt to cause the coalescence and fusion thereof on the fibers.

4. A process which comprises incorporating an aqueous sodium-silicate-asphalt dispersion into fibrous stock, adding an insoluble-silicate-forming reagent to the stock, sheeting the stock, and then heating the sheeted material above the melting point of the asphalt to cause its coalescence and fusion on the fibers.

5. A process which comprises incorporating an aqueous sodium-silicate-asphalt dispersion into fibrous stock, adding aluminum sulphate to effect the precipitation of aluminum silicate and the fixture of the dispersed asphalt on the stock, forming the stock into paper, and heating the paper above the melting point of the asphalt to cause its coalescence and fusion on the fibers of the paper.

6. A process of preparing a paper making stock having asphalt incorporated therein, which comprises making an emulsion of asphalt in water with a soluble emulsifying agent, combining the emulsion with fibrous stock and causing the asphaltic particles to be deposited upon and fixed to the fibres by adding to the mixture of stock and emulsion a reagent capable of reacting with said emulsifying agent to form a voluminous flocculent precipitate.

7. A process of preparing a paper making stock having asphalt incorporated therein, which comprises making an emulsion of asphalt in water with an emulsifying agent, combining the emulsion with fibrous stock, forming in the mixture a voluminous flocculent precipitate by adding thereto a reagent capable of reacting with said emulsifying agent to form such a precipitate, said precipitate being adapted to cause asphaltic particles in the stock mixture to become fixed to and retained upon the fibres thereof.

8. A sized fibrous paper making stock containing dispersed particles of asphalt fixed to and retained upon the fibres by a voluminous flocculent precipitate comprising the reaction product of the material used to effect the dispersion of the asphalt and a precipitant added to the stock.

9. A sized fibrous paper making stock containing dispersed particles of asphalt fixed to and retained upon the fibres by a voluminous flocculent precipitate comprising the reaction product of the material used to effect the dispersion of the asphalt and a soluble salt added to the stock.

In testimony whereof I have affixed my signature.

ALBERT L. CLAPP.